United States Patent [19]

Plueddemann

[11] Patent Number: 4,849,294

[45] Date of Patent: Jul. 18, 1989

[54] COUPLING AGENT COMPOSITION

[75] Inventor: Edwin P. Plueddemann, Midland, Mich.

[73] Assignee: Dow Corning Corporation, Midland, Mich.

[21] Appl. No.: 216,061

[22] Filed: Jun. 20, 1988

Related U.S. Application Data

[62] Division of Ser. No. 26,604, Mar. 17, 1987, abandoned, which is a division of Ser. No. 861,384, May 9, 1986, Pat. No. 4,690,959.

[51] Int. Cl.$^4$ .............................................. B32B 13/12
[52] U.S. Cl. ..................................... 428/451; 428/448
[58] Field of Search ...................... 106/287.11, 287.16; 428/450, 451, 448

[56] References Cited

U.S. PATENT DOCUMENTS

| | | | |
|---|---|---|---|
| 3,179,612 | 4/1965 | Plueddemann | 260/29.2 |
| 3,630,827 | 12/1971 | Hartlein | |
| 3,702,794 | 11/1972 | Hartlein | 156/310 |
| 4,690,959 | 9/1987 | Plueddemann | 428/447 |
| 4,780,358 | 10/1988 | Ito et al. | 428/220 |
| 4,810,767 | 3/1989 | Furukawa et al. | 528/32 |

Primary Examiner—Edith Buffalow
Attorney, Agent, or Firm—Robert L. McKellar

[57] ABSTRACT

Compositions which are particularly useful as coupling agents and primers for polyolefin composites. The compositions comprise fumaric acid and diaminefunctional silanes in mole ratios from 1.0 to 1.4 in nonreactive solvent, particularly water. These compositions are particularly effective in polyethylene composite materials.

1 Claim, No Drawings

COUPLING AGENT COMPOSITION

This application is a divisional application of U.S. Ser. No. 026,604 filed Mar. 17, 1987, now abandoned, which is a divisional application of Ser. No. 861,384, filed May 9, 1986, and which has now issued as U.S. Pat. No. 4,690,959.

BACKGROUND OF THE INVENTION

The present invention relates to a silane coupling agent composition particularly useful in making composite materials of polyolefins, especially polyethylene.

Three types of coupling agents are used in making polyethylene composite materials. The first type of coupling agents chemically grafts to the polyolefin polymer. Vinylsilanes on fillers are known to graft to polyethylene during injection molding, and such fillers have been used in cross-linkable polyethylene insulation coverings of power cable. Mixtures of vinylsilanes with polyfunctional azides have been used to improve the strength and wet strength retention of polymers to glass, metal, and metal oxides, as described in U.S. Pat. No. 3,585,103.

The second type of coupling agents are used to treat the filler material of the composite, so the filler is more solution compatible with the polyolefin. Generally, this approach has been more effective in glassy polymers, such as polystyrene, than in crystalline polymers like polyethylene and polypropylene. The ultimate in compatibility is obtained with trimethoxysilane-modified polymer, e.g., trimethoxysilane-modified polyethylene is an effective primer for polyethylene to glass.

The third type of coupling agents are those agents which are not solution compatible with polyolefins, and generally do not chemically graft to polyolefin resins. Methacrylate functional silanes, in particular 3-methacryloxypropyltrimethoxysilane, are effective coupling agents in clay-filled polyethylene composites, as are cationic styrl-functional silanes such as 3[2(vinyl benzylamino)ethylamino]propyltrimethoxysilane. Their effectiveness is surprising, because neither silane was shown to graft to the polymer. Even amine functional silanes have been used as coupling agents for polyethylene composites with some success. Hartlein discloses that combinations of amine functional silanes and chlorinated organic compounds act as effective coupling agents and primers for polyethylene in U.S. Pat. No. 3,630,827 and U.S. Pat. No. 3,702,794. The third type of coupling agents are thought to act by forming interpenetrating polymer networks with the polyolefin.

SUMMARY OF THE INVENTION

The present invention relates to a coupling agent composition and composite materials using said compositions. The coupling agent compositions of the present application comprise between 1 and 1.4 mole parts fumaric acid, and 1.0 mole part diamine functional silane in water. This composition is particularly effective as a coupling agent for polyethylene. In particular, the preferred coupling agent composition of the present invention comprises 1.0 mole part N-(2-aminoethyl)-3-aminopropyltrimethoxysilane, and between 1.0 and 1.4 mole parts fumaric acid in water.

DETAILED DESCRIPTION OF THE INVENTION

The present invention relates to a coupling agent composition which is particularly effective in making composite materials of polyolefin polymers. The coupling agent composition comprises: (A) a diamine functional silane, (B) fumaric acid; and (C) a nonreactive solvent where the mole ratio of the fumaric acid (B) to the diamine functional silane (A) is between 1.0 and 1.4.

The diamine functional silanes of the coupling agent composition include compounds represented by the general formula

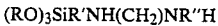

where R denotes an alkyl radical with 1 to 6 carbon atoms, or an alkoxyalkyl radical with 2 to 8 carbon atoms. R' denotes an alkylene radical with 1 to 4 carbon atoms. R" denotes a hydrogen atom, an alkyl radical with 1 to 6 carbons, or an alkenylarylalkyl radical with 8 to 10 carbon atoms. Particular diamine functional silanes include, but are not limited to, N-(2-aminoethyl)-3-aminopropyltrimethoxysilane; N-(2-aminoethyl)-3-aminopropyltriethoxysilane; N-(2-aminoethyl)-3-aminobutyltrimethoxysilane and N-(2-aminoethyl)-2-methyl-3-aminopropyltrimethoxysilane. The diamine functional silanes where R" denotes an alkenylarylalkyl radical include 3-[2(vinyl benzylamino)ethylamino]propyltrimethoxysilane, and similar compounds.

Preferably, the nonreactive solvent is water, however, any solvent capable of solvating the diamine functional silane and fumaric acid can be used.

The amount of each component in the coupling agent composition can vary within certain limits. For instance, the mole ratio of fumaric acid to diamine functional silane must remain within the mole ratio range of 1.0 to 1.4. More preferably, the mole ratio of fumaric acid to diamine functional silane should be between 1.25 and 1.35. Most preferably, the ratio is 1.33. The amount of nonreactive solvent in the composition will depend upon the particular application. However, in general the amount of solvent will be kept at a minimum, i.e., the coupling agent composition will be a nearly saturated solution of the fumaric acid and diamine functional silane mixture. Specifically, the solids content of the coupling agent composition, the weight percent of diamine functional silane and fumaric acid, can range from 0.1 weight percent to 50 weight percent. In solution the mixture of fumaric acid and diamine functional silane form a salt which is stable in solution for several months. The solutions of these salts are effective coupling agents and primers, and constitute the subject matter of the appended claims.

The coupling agent compositions are particularly effective in the production of thermoplastic composite materials. These composites comprise thermoplastic resin, filler, and the coupling agent composition described above. Specifically, the invention is directed at composites of polyolefins and copolymers thereof.

The polyolefins include solid polymers of olefins, particularly alpha-olefins, which comprise from about two to about six carbon atoms, e.g., polyethylene, polypropylene, polybutene, polyisobutylene, poly(4-methyl pentane), and the like. Copolymers of ethylene, and other compounds interpolymerizable with ethylene such as butene-1, pentene-1, propylene, styrene, and the like, may be employed. In general, the copolymer will be comprised of 50 percent by weight or more of polyethylene.

Suitable examples of olefin-vinyl copolymers include ethylene-vinyl acetate, ethylene-vinyl propionate, ethylenevinyl isobutyrate, ethylene-methyl acrylate, ethylene-propylene, and the like. In general, polyethylene constitutes at least 25 percent by weight of the copolymer.

Specific examples of suitable olefin-allyl copolymers include ethylene-allyl benzene, ethylene-allyl ether, and ethylene-acrolein. It is preferred, however, that the polymer be a polyolefin, with polyethylene being most preferred.

Fillers used to reinforce the polyolefin components of the composite include, siliceous material such as glass, quartz, ceramic, asbestos, silicone resin and glass fibers, metals such as aluminum, steel, copper, nickel, magnesium, and titanium, metal oxides such as MgO, $Fe_2O_3$, and $Al_2O_3$, and metal fibers, or metal-coated fibers.

The methods used to make the composite materials are known in the art. For instance, the filler material may be treated with the coupling agent compositions before incorporation into the polyolefin, or the three components may be intermixed simultaneously. Treatment of the filler is the preferred method.

The coupling agent compositions can also be used as primers to promote adhesion of polyolefins to nonparticulate surfaces. For instance, the compositions of the present invention could be used to adhere polyethylene to metal foils, or metal objects by applying the composition to such surfaces, drying said surfaces, and contacting said surfaces with molten polyethylene.

EXAMPLES

The following examples illustrate several of the specific embodiments of the invention. The examples are presented to help those skilled in the art better understand the extent and scope of the invention as defined in the claims in light of this application. The examples do not delineate the full scope of the invention.

EXAMPLE 1

This example demonstrates the importance of using fumaric acid in the coupling agent composition. Equimolar portions of various organic acids and N-(2-aminoethyl)-3-aminopropyltrimethoxysilane were diluted in water to form 20 wt. % solids coupling agent solutions. Glass slides were wiped with the various solutions, and a cross-linkable ethylene-vinylacetate copolymer (EVA), under sufficient pressure to induce flow in the polymer, was pressed and cured with a peroxide catalyst for 30 minutes at 125° C. on the slide. The polyethylenepolyvinylacetate copolymer used was formulated by Springborn Laboratories and contained Elvax-140 ® EVA sold by the DuPont Corporation. Adhesion was measured by pulling the polyethylene film away from the glass slide 90° relative to the plane of the slide. The force required to pull the EVA film off the slide is the peel strength of the film to the primed glass slide. The adhesion of the cured copolymer to the slides was measured for the dry-cured samples, and for cured samples immersed in water at room temperature for one day.

The results are reported in Table 1 and show that the fumaric acid/N-(2-aminoethyl)-3-amino-propyltrimethoxysilane mixture is the only combination to give significant adhesion to glass slides. This indicates that the fumaric acid/silane mixture is an effective coupling agent for ethylene copolymer, glass fiber reinforced composites.

TABLE 1

| | Adhesion of Polyethylene to Primed Glass | |
|---|---|---|
| | (Peel Strength, Kg/inch) | |
| Primer | Dry | 1 Day Water Immersion |
| None | nil | nil |
| 1:1 fumaric acid:silane* | c | c |
| 1:1 maleic acid:silane* | c | 4.1 |
| 1:1 itaconic acid:silane* | c | 5.1 |
| 1:1 succinic acid:silane* | 8.0 | 4.1 |
| 1:1 malonic acid:silane* | 4.0 | 1.0 |
| 1:1 isophthalic acid:silane* | 8.0 | 0.2 |

Note: c denoted cohesive failure in the polymer at over 8 Kg/inch. "Silane*" was N—(2-aminoethyl)-3-amino-propyltrimethoxysilane. All ratios are mole ratios.

EXAMPLE 2

This example illustrates the effect of the fumaric acid to diamine functional silane mole ratio on the coupling agent composition's effectiveness as a primer film. 40 weight percent aqueous solutions of fumaric acid and N-(2-aminoethyl)-3-aminopropyltrimethoxysilane (silane*) were made and applied to the surfaces of clean glass slides. The films formed on the slides were dried for 2 hours at 80° C., and were then measured for water resistance. If the film dissolved or peeled off in the water during immersion, the film was rated poor. If the films did not dissolve or peel, they were rated good.

The stability of the aqueous solutions was also measured by checking the appearance of the samples over a period of 8 months. If no separation of the solution occurred after 4 months, the sample was rated fair. If no separation was observed after 6 months, the sample was rated good. If the sample showed no separation after 8 months, it was rated excellent. The results of these tests are reported in Table 2.

TABLE 2

| | | Film Adhesion to Glass | | | |
|---|---|---|---|---|---|
| | Mole Ratio of Fumaric Acid | Solution | | Primer Film on Glass | |
| No. | to Silane* | Stability | pH | Clarity | Water Resistance |
| 1 | 0.5 | Excellent | 8 | Clear | Poor |
| 2 | 0.67 | Excellent | 7 | Clear | Poor |
| 3 | 1.0 | Poor | 5 | Clear | Good |
| 4 | 1.3 | Excellent | 4 | Clear | Good |
| 5 | 1.5$_a$ | Good | 8 | Hazy | Poor |
| 6 | 2.0$_a$ | Good | 8 | Cloudy | Poor |

Note: $_a$These mixtures required the addition of aqueous ammonia to solubilize in water.

The example clearly shows that the ratio of the fumaric acid to diamine functional silane must be within the narrow range of 1.0 to 1.4 to produce an aqueous solution which is stable and which can form a film which is stable upon immersion in water. Comparison on samples 1, 2, 5 and 6 showed poor film resistance to water, whereas samples 3 and 4 were good when immersed in water.

EXAMPLE 3

This example demonstrates the efficacy of the invention composition in adhering high density polyethylene to glass substrates, aluminum and cold rolled steel. 20 wt. % solids aqueous solutions or fumaric acid and N-(2-aminoethyl)-3-aminopropyltrimethoxysilane of various acid to silane mole ratios were made and used to prime the surfaces of clean glass slides, aluminum, and cold rolled steel. High density polyethylene (HDPE)

was pressed against the various primed surfaces with sufficient pressure to induce flow in the polyethylene, for 1 minute at 250° C. The polyethylene was then allowed to cool on the primed surfaces, and the adhesion of the polyethylene to the primed substrate was measured by the method of Example 1. Samples were immersed in water at room temperature for 4 days and the adhesion of the polyethylene to the primed substrate was measured. The results are reported in Table 3.

TABLE 3

| Acid:Silane Mole Ratio | Adhesion of HDPE (Kg/inch) | | | | | |
|---|---|---|---|---|---|---|
| | Glass | | Aluminum | | C.R. Steel | |
| | Dry | Wet | Dry | Wet | Dry | Wet |
| 0.5 | 4.2 | nil | 8.0 | nil | 1.5 | nil |
| 1.0 | c | c | c | 4.0 | c | d |
| 1.33 | c | c | c | c | c | c |
| 1.5 | c | c | c | 3.0 | c | nil |
| 2.0 | c | nil | 6.0 | 3.0 | c | nil |

Note: c denotes cohesive failure at greater than 8.0 Kg/inch. d denotes that 75% of the HDPE was loose.

The results demonstrate the coupling agent composition can be used as a primer to effectively adhere HDPE to glass, aluminum, or cold rolled steel. The example also shows the importance of the acid to silane mole ratio in effectively adhering HDPE to substrates. The most effective adhesion is accomplished using mixtures with acid:silane ratios of 1:1 and 1.33:1. Since adhesion of HDPE to glass, aluminum, and steel is an accurate indicator of a composition's effectiveness as a coupling agent, the example also demonstrates the effectiveness of the claimed compositions as coupling agents for glass, aluminum, or metal-filled polyethylene composites.

EXAMPLE 4

This example illustrates the effectiveness of the claimed composition to adhere high density polyethylene to glass relative to other commercially available coupling agents, and relative to mixtures of other organic acids with N-(2-aminoethyl)-3-aminopropyltrimethoxysilane. A methacrylate chrome complex, Volan ® D sold by Dupont Corp., (a); a fumarate chrome complex (b) sold as Volan R ® 82 by DuPont Corp.; N-(2-aminoethyl)-3-aminopropyltrimethoxysilane (c); 3-methacryloxypropyltrimethoxysilane (d); 3[2(vinyl benzylamino)ethylamino]-propyltrimethoxysilane (e); Azide ® S-3029 sold by Hercules (f); and aqueous solutions of 1:1 mole mixtures of N-(2-aminoethyl)-3-aminopropyltrimethoxysilane with fumaric acid (g) itaconic acid (h) maleic acid (i) and succinic acid (j) were tested as primers. Azide ® S-3029 sold by Hercules is an azide functional silane of the general formula (MeO)₃Si-R-SO₂N₃ where R is a divalent organic radical.

20% solids solutions of various coupling agent compositions were applied to clean glass slides to form films with the exception of a and b which were used as sold. Molten high density polyethylene was applied to the surface of the slides by pressing the polyethylene with sufficient pressure to induce flow, and the film thus formed was allowed to solidify. The peel strength of the polyethylene film to the slides was measured by the method of Example 1. Additional samples were placed in boiling water for various periods (2 hours and 4 hours). The peel strength of the polyethylene film to the slides after boiling was measured. Table 4 summarizes the results of these measurements.

TABLE 4

| Comparison to Commercial Coupling Agents | | | | |
|---|---|---|---|---|
| | | Peel Strength of Polyethylene Film (Kg/in.) | | |
| Primer | Solvent | Dry | 2 hour boil | 4 hour boil |
| None | — | nil | nil | nil |
| a | — | 1.0 | nil | — |
| b | — | x | 1.5 | nil |
| c | H₂O | 0.5 | nil | — |
| d | MeOH | 0.5 | nil | — |
| e | MeOH | x | 0.5 | — |
| f | CH₂Cl₂ | x | x | x |
| g | H₂O | x | x | x |
| h | H₂O | x | 2.5 | nil |
| i | H₂O | x | 1.4 | nil |
| j | H₂O | 0.8 | nil | — |

Note: x denotes cohesive failure of the polyethylene film at greater than 5.0 Kg/inch. g is the invention composition. a–f, and h–j are comparative examples.

The results indicate that the coupling agent composition of the invention, g, gives better adhesion of polyethylene to glass than most other commercial coupling agents. The results also show that the invention composition requires the use of fumaric acid, i.e., other acids do not provide the same degree of adhesion and resistance to water as the fumaric acid mixture does. Only comparative sample f, an azide functional silane, was as effective a primer as the coupling agent compositions of the present application, sample g.

EXAMPLE 5

This example illustrates the ability of the coupling agent composition of the invention to adhere polyethylene to metal surfaces relative to the ability of commercially available coupling agents.

Various coupling agent solutions were applied to stainless steel surfaces to form primer films. The steel surfaces were heated to 100° C and molten polyethylene heated to 260° C was troweled onto the primed surface. Upon cooling the peel strength of the polyethylene was measured for each sample, both dry and after boiling for 2 hours in water.

The various primers were (a) 3[2(vinyl benzylamino) ethylamino]propyltrimethoxysilane and dicumyl peroxide; (b) 3[2(vinyl benzylamino)ethylamino]propyltrimethoxysilane, dicumyl peroxide, and diallyl fumarate; (c) a 1:1 mole ratio solution of 3[2(vinyl benzylamino)ethylamino]propyltrimethoxysilane, and fumaric acid; (d) a 1:1 mole ratio solution of N-(2-aminoethyl)-3-aminopropyltrimethoxysilane and fumaric acid; (e) pH neutralized 1:1 mole ratio solution of 3[2(vinyl benzylamino)ethylamino]propyltrimethoxysilane and fumaric acid; (f) 3-methacryloxypropyltrimethoxysilane; and (g) Azide ® S-30765 sold by Hercules. Solutions (a) through (f) contained 20% solids. (g) was used in its commercially available form. The adhesion between the stainless steel and polyethylene provided by primer films of the various mixtures is reported in the following table, and was measured using the methods described in Example 1.

TABLE 5

| | Adhesion to Steel (Kg/inch) | |
|---|---|---|
| Primer | Dry | Wet (2 hour boil) |
| a | 1.5 | nil |
| b | x | 1.5 |
| c | x | 1.0 |
| d | x | x |

TABLE 5-continued

| Primer | Adhesion to Steel (Kg/inch) | |
|---|---|---|
| | Dry | Wet (2 hour boil) |
| e | x | 5.0 |
| f | y | y |
| g | y | y |

Note: x denotes cohesive failure of the polyethylene at greater than 5.0 Kg/inch. y denotes that the polyethylene would not adhere to the primer film at all during the application of the polyethylene by troweling. The three solutions encompassed by the invention, c, d, and e showed good dry adhesion of polyethylene to stainless steel. Compositions d and e of the invention showed particularly good polyethlene to stainless steel adhesion after boiling.

The results demonstrate that the coupling agent compositions of the present application adhere polyethylene to steel more effectively than other commercially available coupling agents. The example also demonstrates that the compositions of the present invention can be used as primers to adhere polyethylene to stainless steel at lower temperatures (100° C) than other primers allow.

What is claimed is:

1. A composite material comprised of:

a nonparticulate surface; and polyolefin adhered to said nonparticulate surface with a composition comprised of;

(A) a diamine functional silane chosen from the group consisting of N-(2-aminoethyl)-3-aminopropyltrimethoxysilane, N-(2-aminoethyl)-2-methyl-3-aminopropyltrimethoxysilane and 3-[2(vinyl benzylamino) ethylamino]propyltrimethoxysilane, (B) fumaric acid; and (C) water, where the mole ratio of (B) to (A) is 1.0 to 1.4.

* * * * *